US012643133B2

(12) United States Patent
Lee et al.

(10) Patent No.: US 12,643,133 B2
(45) Date of Patent: Jun. 2, 2026

(54) TREATMENT LIQUID DISCHARGE ASSEMBLY AND TREATMENT LIQUID DISCHARGE METHOD

(71) Applicant: SEMES CO., LTD., Chungcheongnam-do (KR)

(72) Inventors: Kyeong Min Lee, Chungcheongnam-do (KR); Tae-keun Kim, Chungcheongnam-do (KR); Kang Sul Kim, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 191 days.

(21) Appl. No.: 18/525,975

(22) Filed: Dec. 1, 2023

(65) Prior Publication Data

US 2024/0198399 A1 Jun. 20, 2024

(30) Foreign Application Priority Data

Dec. 14, 2022 (KR) ........................ 10-2022-0175290

(51) Int. Cl.
*B08B 13/00* (2006.01)
*B08B 3/02* (2006.01)

(52) U.S. Cl.
CPC ................ *B08B 13/00* (2013.01); *B08B 3/02* (2013.01); *B08B 2203/02* (2013.01)

(58) Field of Classification Search
CPC ....... B08B 13/00; B08B 3/02; B08B 2203/02; F16L 39/00; H01L 21/67017; H01L 21/6704; H01L 21/67051; H01L 21/02057; H01L 21/67253; H10P 72/0402; H10P 72/0411; H10P 70/20; H10P 72/0414; H10P 72/0604
See application file for complete search history.

(56) References Cited

U.S. PATENT DOCUMENTS 10,564,546 B2 * 2/2020 Sakurai ..................... G03F 7/11
2006/0213538 A1 * 9/2006 Umezawa ............... H01L 22/12 134/113

(Continued)

FOREIGN PATENT DOCUMENTS

JP 5248209 B2 7/2013
KR 10-2009-0051519 * 5/2009

(Continued)

*Primary Examiner* — Alexander Markoff

(74) *Attorney, Agent, or Firm* — Carter, DeLuca & Farrell LLP

(57) ABSTRACT

The present invention relates to a treatment liquid discharge assembly and a treatment liquid discharge method, and the treatment liquid discharge assembly includes a drain manifold connected to at least one discharge line of the substrate treatment apparatus and configured to define a predetermined accommodation space to temporarily accommodate a treatment liquid, and a drain pipe connected to a bottom surface of the accommodation space, in which the drain pipe defines a level difference with a predetermined height in the accommodation space of the drain manifold, and the drain pipe protrudes by the predetermined height from a bottom surface of the accommodation space toward an upper side of the accommodation space to define a buffer space in which the treatment liquid.

12 Claims, 20 Drawing Sheets

(56) References Cited

U.S. PATENT DOCUMENTS

| | | | | |
|---|---|---|---|---|
| 2013/0220478 | A1 * | 8/2013 | Kasahara | B65B 3/04 141/2 |
| 2016/0086845 | A1 * | 3/2016 | Sakai | H01L 21/76831 438/700 |
| 2018/0185886 | A1 * | 7/2018 | Kim | B08B 3/04 |

FOREIGN PATENT DOCUMENTS

| | | | |
|---|---|---|---|
| KR | 10-107813 | * | 10/2011 |
| KR | 10-1078313 | B1 | 10/2011 |
| KR | 10-2013-0032444 | * | 4/2013 |
| KR | 10-2017-0128114 | A | 11/2017 |
| KR | 10-2018-0076412 | * | 7/2018 |
| KR | 10-2018-0076412 | A | 7/2018 |
| KR | 10-1910798 | B1 | 10/2018 |

* cited by examiner

TREATMENT LIQUID DISCHARGE ASSEMBLY AND TREATMENT LIQUID DISCHARGE METHOD

CROSS-REFERENCE TO RELATED PATENT APPLICATION

This application claims the benefit of Korean Patent Application No. 10-2022-0175290, filed on Dec. 14, 2022, in the Korean Intellectual Property Office, the disclosure of which is incorporated herein in its entirety by reference.

TECHNICAL FIELD

The present invention relates to a treatment liquid discharge assembly and a treatment liquid discharge method, and more particularly, to a treatment liquid discharge assembly and a treatment liquid discharge method, which are capable of discharging a treatment liquid, which is produced after a substrate is treated during a process of treating the substrate, from a substrate treatment apparatus.

BACKGROUND ART

Various processes, such as photolithography, ashing, ion implantation, thin-film deposition, and cleaning, are performed on a substrate to manufacture a semiconductor device or display. Among the processes, the cleaning process is a process of removing particles remaining on the substrate and may be performed before and after the processes.

In general, the cleaning process includes a process of supplying chemicals onto a substrate that is supported on a spin head and rotated, a process of removing the chemicals from the substrate by supplying a cleaning liquid, such as deionized water (DIW), onto the substrate, a process of substituting the cleaning liquid on the substrate with an organic solvent by supplying the organic solvent, such as isopropyl alcohol (IPA) which has lower surface tension than the cleaning liquid, onto the substrate, and a process of removing the substituted organic solvent from the substrate.

The cleaning process may include a process of supplying a treatment liquid containing polymer and solvent onto the substrate. When the treatment liquid is applied onto the substrate and then the solvent containing volatile components volatilizes, the polymer adsorbs particles while being cured by a change in volume of the treatment liquid. Thereafter, the polymer, which has adsorbed the particles, is stripped from the substrate by the deionized water, and then the substrate is cleaned again by an organic solvent such as IPA.

The treatment liquid, which has been used for the process of cleaning the substrate by using curable polymer coating as described above, may be discharged to the outside through a drain pipe. However, stripped suspended materials of a polymer coating layer, which are stripped from the substrate during the discharge process, adhere to and accumulate on a wall surface of the drain pipe, which causes a problem in that the drain pipe is easily clogged. In addition, there is a problem in that the stripped suspended materials reach a waste liquid tank through the drain pipe and react with the other treatment liquids. For this reason, there is a problem in that the stripped suspended materials grow and clog the pipe or produce other by-products by reacting with the other treatment liquids.

SUMMARY OF THE INVENTION

The present invention has been made in an effort to solve various problems including the above-mentioned problem, and an object of the present invention is to provide a treatment liquid discharge assembly and a treatment liquid discharge method, which are capable of defining a buffer space in a drain manifold to temporarily accommodate a treatment liquid discharged from a substrate treatment process so that stripped suspended materials contained in the treatment liquid may be dissolved in isopropyl alcohol (IPA), which is discharged from a process of subsequently treating the substrate, in the buffer space of the drain manifold and then discharged. However, the object of the present invention is illustrative, and the scope of the present invention is not limited by the object.

An embodiment of the present invention provides a treatment liquid discharge assembly. A treatment liquid discharge assembly may include: a drain manifold connected to at least one discharge line of a substrate treatment apparatus and configured to define a predetermined accommodation space to temporarily accommodate a treatment liquid discharged from a substrate treatment process in the substrate treatment apparatus; and a drain pipe connected to a bottom surface of the accommodation space to discharge the treatment liquid, which is accommodated in the accommodation space of the drain manifold, to the outside, in which the drain pipe defines a level difference with a predetermined height in the accommodation space of the drain manifold, and the drain pipe protrudes by the predetermined height from a bottom surface of the accommodation space toward an upper side of the accommodation space to define a buffer space in which the treatment liquid, which is discharged from the substrate treatment apparatus and collected in the accommodation space, is temporarily accommodated, until the treatment liquid reaches a level corresponding to the predetermined height in the accommodation space, and then discharged.

According to the embodiment, the substrate treatment apparatus may perform a coating layer forming process of forming a polymer coating layer by spraying a dissolving liquid and a curable polymer onto the substrate in a treatment space and a stripping process of spraying a stripping liquid to strip the polymer coating layer cured on the substrate to perform a process of cleaning the substrate by using the curable polymer, and the treatment liquid discharged from the substrate treatment apparatus may comprise the stripping liquid sprayed to strip the polymer coating layer cured on the substrate during the stripping process and stripped suspended materials of the polymer coating layer stripped from the substrate.

According to the embodiment, the stripping liquid may contain deionized water (DI water).

According to the embodiment, the substrate treatment apparatus may perform a removal process of spraying a cleaning liquid onto the substrate in the treatment space to remove residues remaining on the substrate after the polymer coating layer is stripped during the stripping process, and the treatment liquid, which is temporarily accommodated in the buffer space of the drain manifold, may be discharged to the outside through the drain pipe in a state in which the stripped suspended materials are dissolved in the cleaning liquid discharged through the discharge line of the substrate treatment apparatus during the removal process.

According to the embodiment, the cleaning liquid may contain isopropyl alcohol (IPA).

According to the embodiment, the drain manifold may be formed in a polygonal container shape or a cylindrical shape closed in all directions to define the accommodation space.

According to the embodiment, the drain manifold may include an inclined wall portion formed to be inclined at a predetermined angle with respect to the bottom surface of the accommodation space and provided on at least a part of a lower side of a lateral surface of the drain manifold so that a width of the drain manifold gradually and linearly decreases toward the bottom surface to which the drain pipe is connected.

According to the embodiment, the inclined wall portion may be formed to be inclined from an upper end to a lower end thereof in a direction toward the drain pipe protruding toward the accommodation space.

According to the embodiment, the drain manifold may include a curved wall portion formed in a convexly curved shape and provided on at least a part of a lower side of a lateral surface of the drain manifold so that a width of the drain manifold gradually and non-linearly decreases toward the bottom surface to which the drain pipe is connected.

According to the embodiment, the curved wall portion may be formed such that an inclination angle of an imaginary tangential line, which is externally in contact with a wall surface, gradually decreases with respect to the bottom surface of the accommodation space from an upper end to a lower end thereof.

According to the embodiment, the treatment liquid discharge assembly may further include: an auxiliary drain pipe connected to a portion of the bottom surface of the accommodation space corresponding to the buffer space to discharge the treatment liquid containing the stripped suspended materials accommodated in the buffer space in the accommodation space of the drain manifold.

According to the embodiment, the auxiliary drain pipe may include an on-off valve provided in an inlet part connected to the bottom surface of the accommodation space to selectively open or close the auxiliary drain pipe.

According to the embodiment, the drain manifold may include a liquid particle counter installed in the buffer space and configured to measure a content of the stripped suspended materials contained in the treatment liquid accommodated in the buffer space.

According to the embodiment, the drain manifold may further include a discharge control unit configured to apply a control signal to the on-off valve to discharge the treatment liquid, which is accommodated in the buffer space, through the auxiliary drain pipe when the content of the stripped suspended materials measured by the liquid particle counter exceeds a preset reference value.

According to the embodiment, the drain manifold may include a buffer wall part formed to surround the drain pipe protruding toward the accommodation space in the buffer space and configured to divide the buffer space into a first space and a second space.

According to the embodiment, the buffer wall part may be formed at a height higher than the predetermined height by which the drain pipe protrudes from the bottom surface of the accommodation space.

Another embodiment of the present invention provides a treatment liquid discharge method. The treatment liquid discharge method may include: a treatment liquid collecting step of collecting a treatment liquid, which contains stripped suspended materials of a polymer coating layer discharged from a process of cleaning a substrate by using a curable polymer, and temporarily accommodating the treatment liquid in an accommodation space of a drain manifold connected to at least one discharge line of a substrate treatment apparatus; a suspended material dissolving step of dissolving the stripped suspended materials, which are contained in the treatment liquid, in the cleaning liquid discharged from the substrate treatment apparatus to the accommodation space of the drain manifold during a process of removing residues remaining on the substrate by spraying a cleaning liquid onto the substrate; and a dissolved treatment liquid discharge step of discharging the treatment liquid having the completely dissolved stripped suspended material to the outside through a drain pipe connected to a bottom surface of the accommodation space, in which in the treatment liquid collecting step, the treatment liquid is temporarily accommodated in a buffer space defined in the accommodation space by the drain pipe protruding by a predetermined height from the bottom surface of the accommodation space toward an upper side of the accommodation space.

According to the embodiment, the cleaning process may include: a coating layer forming step of forming a polymer coating layer on the substrate by spraying a dissolving liquid and the curable polymer in a treatment space of the substrate treatment apparatus; a coating layer stripping step of spraying a stripping liquid onto the substrate to strip the polymer coating layer cured on the substrate; and a residue removing step of spraying a cleaning liquid onto the substrate to remove residues remaining on the substrate after the polymer coating layer is stripped in the coating layer stripping step, the treatment liquid collected in the treatment liquid collecting step may comprise the stripping liquid sprayed to strip the polymer coating layer cured on the substrate in the coating layer stripping step and the stripped suspended materials of the polymer coating layer stripped from the substrate, and in the suspended material dissolving step, the stripped suspended materials contained in the treatment liquid may be dissolved in the cleaning liquid discharged through the discharge line of the substrate treatment apparatus in the residue removing step.

According to the embodiment, in the dissolved treatment liquid discharge step, the treatment liquid may be discharged to the drain pipe during a process in which a level of the treatment liquid accommodated in the buffer space is increased to be higher than the drain pipe, which protrudes by the predetermined height from the bottom surface of the accommodation space, by the cleaning liquid supplied in the suspended material dissolving step.

Still another embodiment of the present invention provides a treatment liquid discharge assembly. The treatment liquid discharge assembly may include: a drain manifold connected to at least one discharge line of a substrate treatment apparatus, formed in a polygonal container shape or a cylindrical shape closed in all directions, and configured to define a predetermined accommodation space therein to temporarily accommodate a treatment liquid discharged from a substrate treatment process in the substrate treatment apparatus; and a drain pipe connected to a bottom surface of the accommodation space to discharge the treatment liquid, which is accommodated in the accommodation space of the drain manifold, to the outside, in which the drain pipe defines a level difference with a predetermined height in the accommodation space in the drain manifold, and the drain pipe protrudes by the predetermined height from a bottom surface of the accommodation space toward an upper side of the accommodation space to define a buffer space in which the treatment liquid, which is discharged from the substrate treatment apparatus and collected in the accommodation space, is temporarily accommodated, until the treatment liquid reaches a level corresponding to the predetermined height in the accommodation space, and then discharged, in which the substrate treatment apparatus performs a coating layer forming process of forming a polymer coating layer by spraying a dissolving liquid and a curable polymer onto the substrate in a treatment space and a stripping process of spraying a stripping liquid containing deionized water (DI water) to strip the polymer coating layer cured on the substrate to perform a process of cleaning the substrate by using the curable polymer, in which the treatment liquid discharged from the substrate treatment apparatus comprises the stripping liquid sprayed to strip the polymer coating layer cured on the substrate during the stripping process and stripped suspended materials of the polymer coating layer stripped from the substrate, in which the substrate treatment apparatus performs a removal process of spraying a cleaning liquid containing isopropyl alcohol (IPA) onto the substrate in the treatment space to remove residues remaining on the substrate after the polymer coating layer is stripped during the stripping process, and in which the treatment liquid, which is temporarily accommodated in the buffer space of the drain manifold, is discharged to the outside through the drain pipe in a state in which the stripped suspended materials are dissolved in the cleaning liquid discharged through the discharge line of the substrate treatment apparatus during the removal process.

According to the embodiment of the present invention configured as described above, the drain manifold connected to the discharge line of the substrate treatment apparatus has the drain pipe connected to the bottom surface of the drain manifold and protruding upward by the predetermined height from the bottom surface of the drain manifold to temporarily accommodate the treatment liquid discharged from the substrate treatment process, such that the predetermined buffer space may be defined in the accommodation space of the drain manifold.

Therefore, the treatment liquid containing the stripped suspended materials discharged from the substrate treatment process may be temporarily accommodated in the buffer space of the drain manifold, the stripped suspended materials contained in the treatment liquid may be dissolved in the buffer space by isopropyl alcohol (IPA), which is discharged from the process of subsequently treating the substrate and introduced into the drain manifold, and the treatment liquid may be discharged to the outside through the drain pipe.

Accordingly, it is possible to implement the treatment liquid discharge assembly and the treatment liquid discharge method, which are capable of dissolving the stripped suspended materials contained in the treatment liquid discharged from the substrate treatment process in the buffer space of the drain manifold and then discharging the stripped suspended materials through the drain pipe, thereby preventing the drain pipe from being clogged by the adhesion of the stripped suspended materials and preventing the stripped suspended materials from reacting with the other treatment liquids in the waste liquid tank, which causes the production of other by-products. Of course, the scope of the present invention is not limited by the effects.

DETAILED DESCRIPTION

Figure 1:
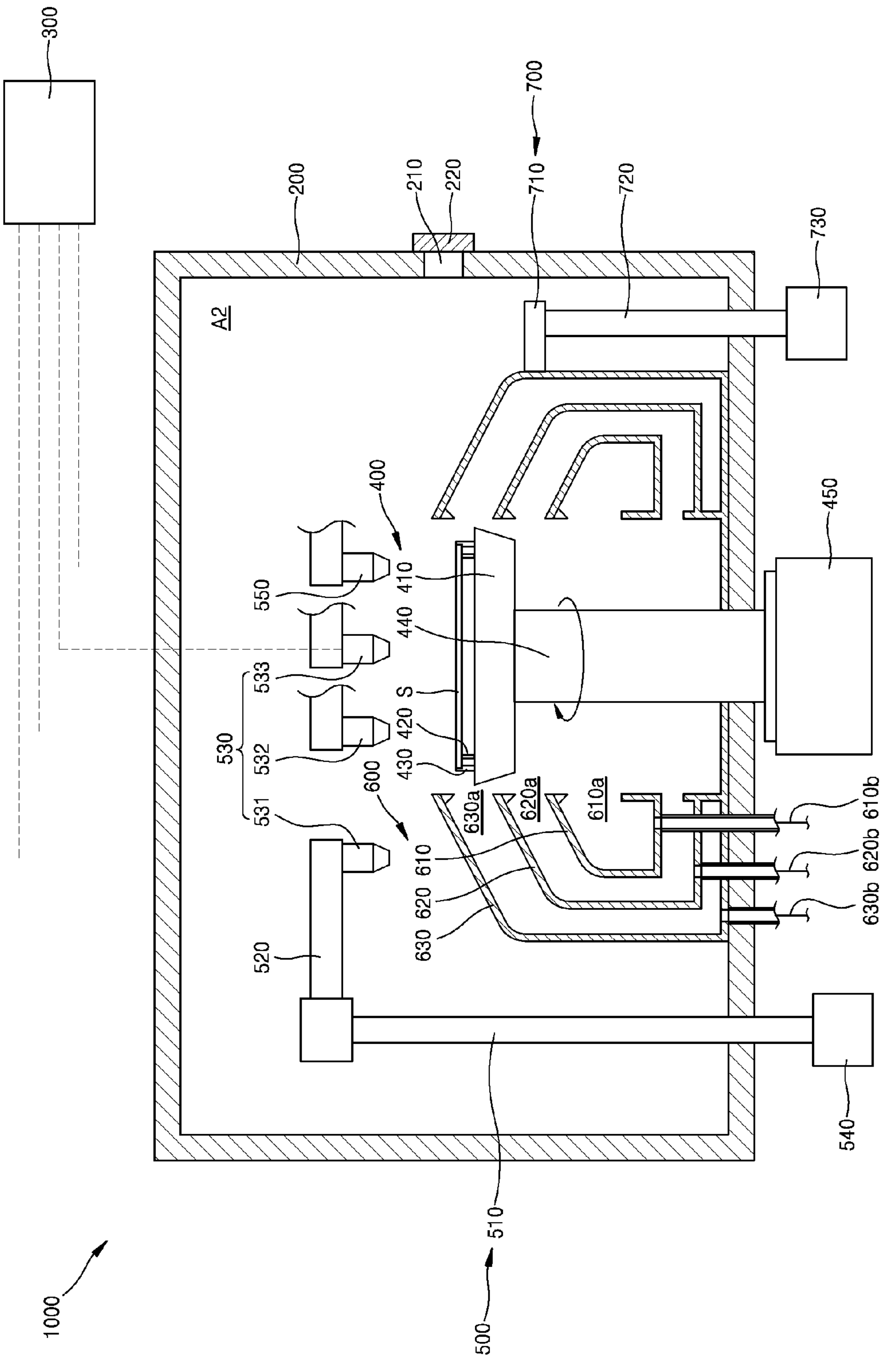
FIG. 1 is a cross-sectional view schematically illustrating a substrate treatment apparatus that discharges a treatment liquid to a treatment liquid discharge assembly according to an embodiment of the present invention.

Hereinafter, exemplary embodiments of the present invention will be described in detail with reference to the accompanying drawings.

Embodiments of the present invention are provided to more completely explain the present invention to those skilled in the art. The following embodiments may be modified in various forms, and the scope of the present invention is not limited to the following embodiments. The embodiments are provided to make the present invention more thorough and complete, and to completely convey the spirit of the present invention to those skilled in the art. In addition, a thickness or size of each layer illustrated in the drawings is exaggerated for the purpose of clarity and for convenience of description.

Hereinafter, the embodiments of the present invention will be described with reference to the drawings that schematically illustrate ideal embodiments of the present invention. In the drawings, for example, depending on manufacturing techniques and/or tolerance, variations of the illustrated shape may be expected. Therefore, it should be interpreted that the embodiments based on the spirit of the present invention are not limited to particular shapes of regions illustrated in the present specification but include changes in shapes made during a manufacturing procedure, for example.

Figure 2:
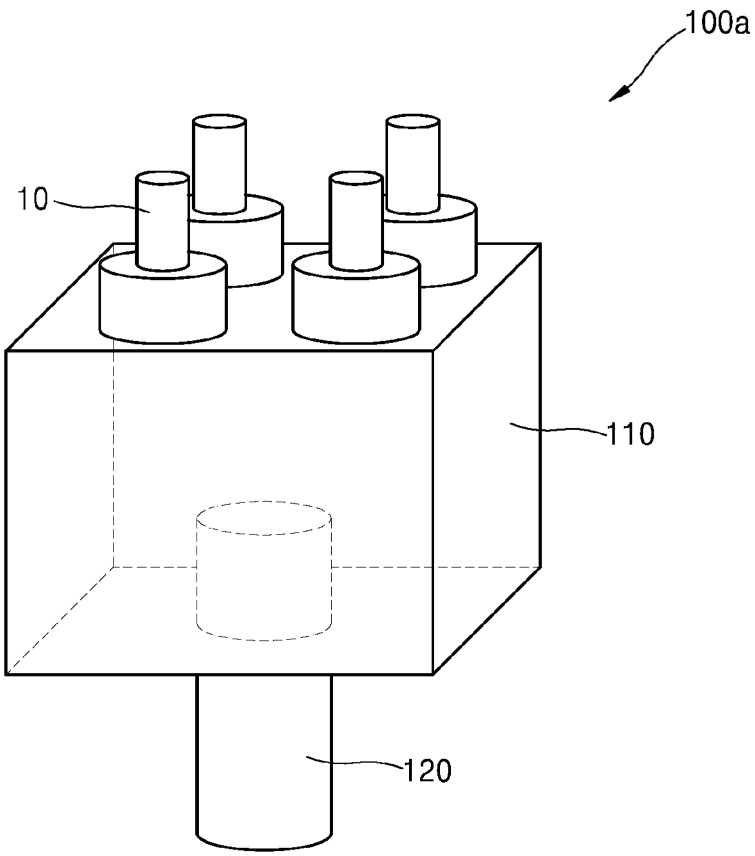
FIGS. 2 and 3 are a perspective view and a cross-sectional view schematically illustrating the treatment liquid discharge assembly according to the embodiment of the present invention.
Figure 3:
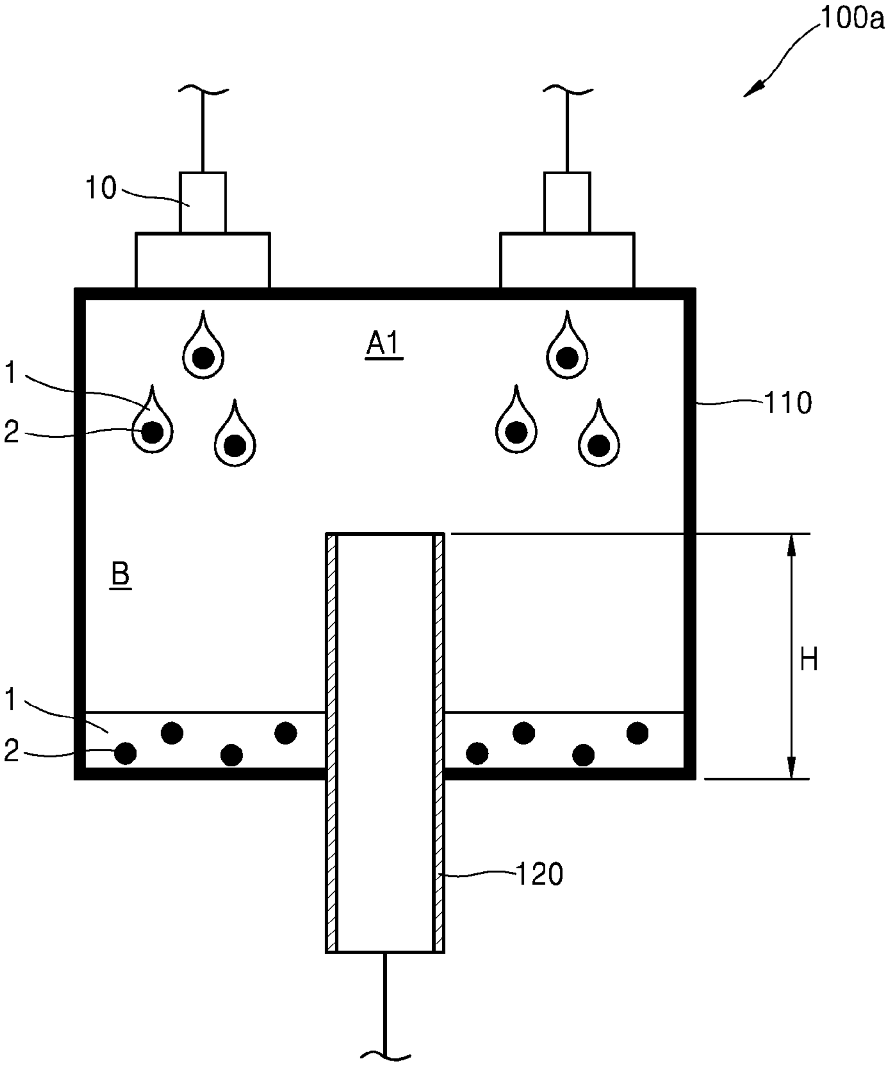
Figure 4:
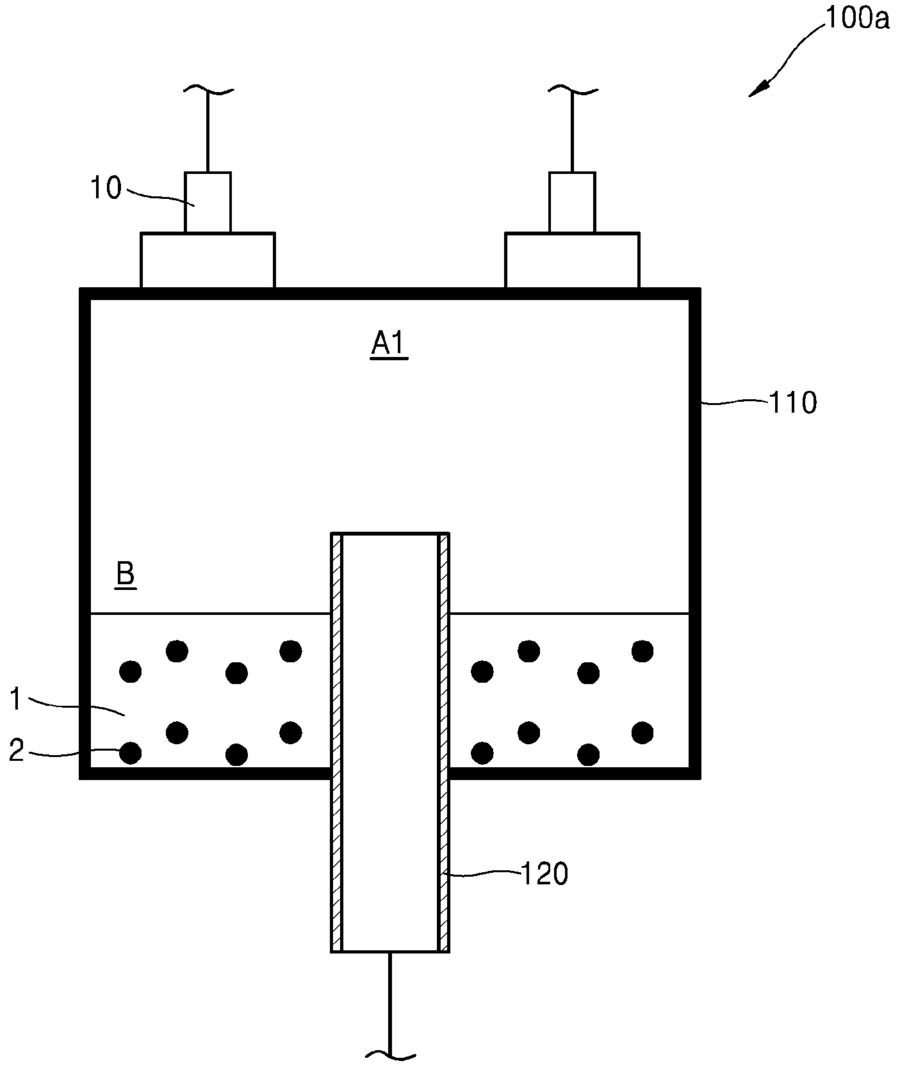
FIGS. 4 to 6 are cross-sectional views illustrating, in a step-by-step manner, processes in which the treatment liquid discharge assembly in FIG. 3 treats and discharges the treatment liquid.
Figure 5:
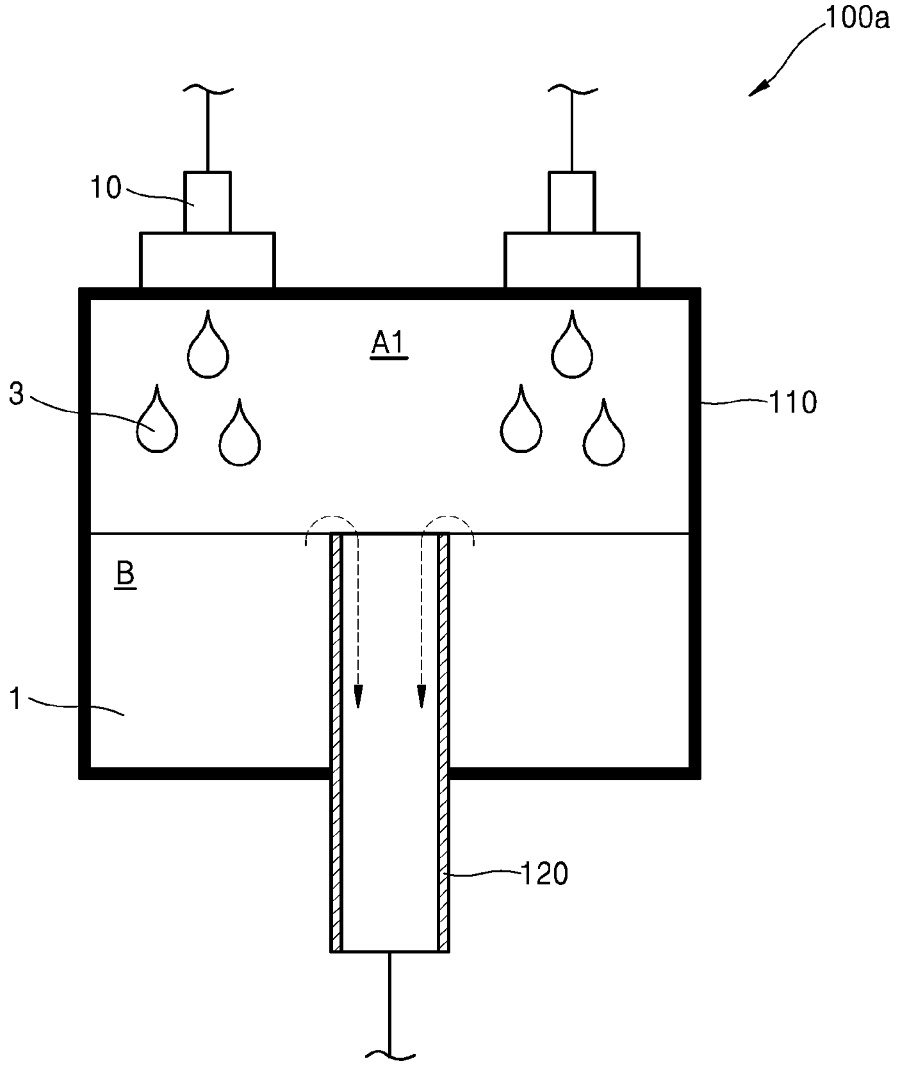
Figure 6:
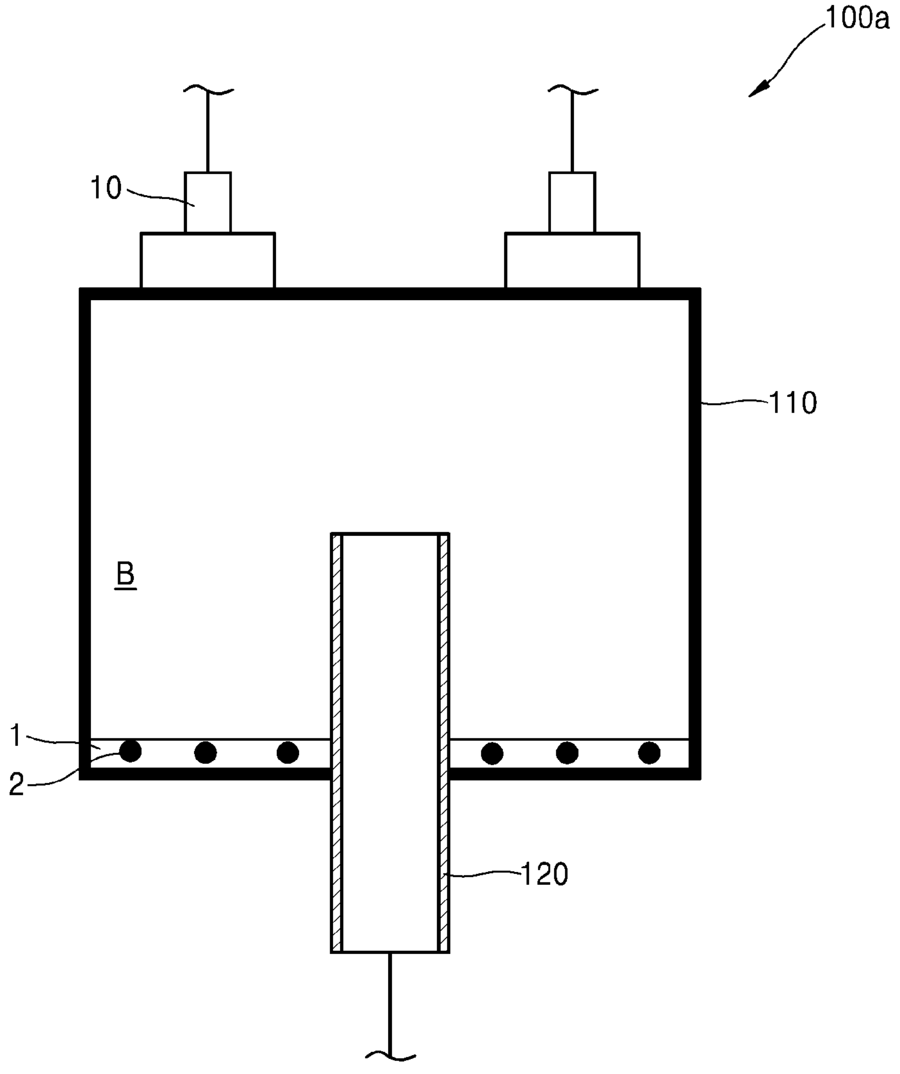

FIG. 1 is a cross-sectional view schematically illustrating a substrate treatment apparatus 1000 that discharges a treatment liquid 1 to a treatment liquid discharge assembly 100 according to an embodiment of the present invention, and FIGS. 2 and 3 are a perspective view and a cross-sectional view schematically illustrating the treatment liquid discharge assembly 100 according to the embodiment of the present invention. Further, FIGS. 4 to 6 are cross-sectional views illustrating, in a step-by-step manner, processes in which the treatment liquid discharge assembly 100 in FIG. 3 treats and discharges the treatment liquid 1, FIGS. 7 to 12 are cross-sectional views illustrating, in a step-by-step manner, processes in which the substrate treatment apparatus 1000 in FIG. 1 treats a substrate S, and FIGS. 13 to 19 are cross-sectional views schematically illustrating various embodiments of the treatment liquid discharge assembly 100.

As illustrated in FIG. 1, the substrate treatment apparatus 1000, which discharges the treatment liquid 1 to the treatment liquid discharge assembly 100 to be described below may broadly include a chamber 200, a controller 300, a substrate support unit 400, a spray unit 500, a recovery unit 600, and a lifting unit 700.

As illustrated in FIG. 1, the chamber 200 may define a treatment space A2 therein so that a process of cleaning the substrate S may be performed inside the chamber 200. For example, the chamber 200 may be formed in a quadrangular container shape, a polygonal container shape, or a circular container shape and define the treatment space A2 therein in which the process of cleaning the substrate S is performed.

The chamber 200 may have a gate 210 provided on one surface facing a transfer chamber (not illustrated), and the gate 210 may be opened or closed by a door 220. The gate 210 may serve as an inlet through which the substrate S may be loaded.

As illustrated in FIG. 1, the substrate support unit 400 is a kind of spin head. The substrate support unit 400 may be installed in the treatment space A2 in the chamber 200 and support and rotate the substrate S during the cleaning process.

More specifically, the substrate support unit 400 may include a spin body 410, support pins 420, chuck pins 430, and a support shaft 440. The spin body 410 may have a top surface having an approximately circular shape when viewed from the top side. The support shaft 440 may be fixedly coupled to a bottom surface of the spin body 410 and rotated by a drive unit 450.

The support pins 420 of the substrate support unit 400 may be provided as a plurality of support pins 420 provided on the top surface of the spin body 410. For example, the plurality of support pins 420 is disposed to be spaced apart from one another at predetermined intervals along a rim portion of the top surface of the spin body 410 and disposed radially at equal angles with respect to a central axis (rotation axis) of the spin body 410. As described above, the support pins 420 may be disposed to define an annular ring shape as a whole by being combined with one another and support the rim portion of a rear surface of the substrate S so that the substrate S is spaced apart from the top surface of the spin body 410 at a predetermined distance.

The chuck pins 430 of the substrate support unit 400 may also be provided as a plurality of chuck pins 430 provided on the top surface of the spin body 410 and disposed to be farther from the central axis of the spin body 410 than the support pins 420 from the central axis of the spin body 410. The chuck pin 430 protrudes from the top surface of the spin body 410 to a degree higher than the degree to which the support pin 420 protrudes. The chuck pins 430 may support a lateral surface of the substrate S to prevent the substrate S from deviating from an exact position in a transverse direction by a centrifugal force when the spin body 410 rotates.

The chuck pin 430 may be installed to be movable linearly between a standby position and a support position that are spaced apart from each other at a predetermined distance in a radial direction of the spin body 410. For example, the standby position may be a position farther from the central axis of the spin body 410 than the support position from the central axis of the spin body 410. Therefore, the chuck pin 430 is positioned at the standby position when the substrate S is loaded on or unloaded from the spin body 410. When the cleaning process is performed on the substrate S, the chuck pin 430 may be linearly moved and positioned at the support position. The chuck pin 430 positioned at the support position may be in contact with the lateral surface of the substrate S.

As illustrated in FIG. 1, the spray unit 500 may be installed in the treatment space A2 and positioned above the substrate support unit 400. The spray unit 500 may spray one or more types of liquid chemicals onto the substrate S.

For example, the spray unit 500 may include a curable polymer supply nozzle 550, liquid supply nozzles 530, and the controller 300 configured to control the nozzles. More specifically, the liquid supply nozzles 530 may include a stripping liquid supply nozzle 531, a dissolving liquid supply nozzle 532, and a cleaning liquid supply nozzle 533.

The nozzles 531, 532, 533, and 550 may be respectively supported by different supports 520 (not illustrated). One end of the support 520 may be supported on an upper end of a support shaft 510. The support shaft 510 may be disposed at one side of the recovery unit 600 to be described below. The support shaft 510 may be rotated and moved upward or downward by a driving member 540.

Therefore, the nozzles 531, 532, 533, and 550 may be independently controlled while swinging above the substrate S, which is supported on the substrate support unit 400, by rotations of the support shafts 510 (not illustrated). The nozzles 531, 532, 533, and 550 may be installed on a single support 520.

As illustrated in FIG. 1, the recovery unit 600 may be formed in a container shape opened at an upper side thereof to surround the substrate support unit 400 and installed in a treatment space A. The recovery unit 600 may recover the liquid chemicals scattering from the substrate S when the substrate S rotates.

For example, the recovery unit 600 may have a container shape opened at the upper side thereof as a whole and include an internal recovery container 610, an intermediate recovery container 620, and an external recovery container 630. The recovery containers 610, 620, and 630 may recover different liquid chemicals among the liquid chemicals used for the cleaning process.

More specifically, the internal recovery container 610 may be formed in an annular ring shape to surround the substrate support unit 400, the intermediate recovery container 620 may be formed in an annular ring shape to surround the internal recovery container 610, and the external recovery container 630 may be formed in an annular ring shape to surround the intermediate recovery container 620. A first space 610*a* of the internal recovery container 610, a second space 620*a* of the intermediate recovery container 620, and a third space 630*a* of the external recovery container 630 may respectively serve as inlet ports through which the liquid chemical is introduced into the internal recovery container 610, the intermediate recovery container 620, and the external recovery container 630.

For example, the inlet ports of the recovery containers 610, 620, and 630 may be positioned at different heights, and recovery lines 610*b*, 620*b*, and 630*b* may be respectively connected to bottom surfaces of the recovery containers 610, 620, and 630. The recovery lines 610*b*, 620*b*, and 630*b* may discharge the liquid chemical introduced through the recovery containers 610, 620, and 630, and the discharged liquid chemical may be reused by being recycled by an external liquid chemical recycling system (not illustrated).

As illustrated in FIG. 1, the lifting unit 700 may move the recovery unit 600 upward or downward in an upward/downward direction. As the recovery unit 600 is moved upward or downward by the lifting unit 700, a height of the recovery unit 600 relative to the substrate support unit 400 may be changed.

The lifting unit 700 may include a bracket 710, a movable shaft 720, and a driver 730. For example, the bracket 710 may be fixedly installed on an outer wall of the recovery unit 600. The movable shaft 720 may be fixedly coupled to the bracket 710 and moved in the upward/downward direction by the driver 730.

More specifically, the recovery unit 600 may be moved downward by the lifting unit 700 so that the substrate support unit 400 may protrude upward from the recovery unit 600 when the substrate S is loaded onto the substrate support unit 400 or unloaded from the substrate support unit 400. In addition, during the cleaning process, the height of the recovery unit 600 may be adjusted so that the liquid chemical may be introduced into the recovery containers 610, 620, and 630 set depending on the types of liquid chemicals to be supplied to the substrate S.

In the substrate treatment apparatus 1000, the liquid chemicals, which are recovered in the recovery containers 610, 620, and 630 and discharged through the recovery lines 610*b*, 620*b*, and 630*b* during the process of cleaning the substrate S, may be introduced into the treatment liquid discharge assembly 100.

As illustrated in FIG. 2, a treatment liquid discharge assembly 100*a* according to the embodiment of the present invention may broadly include a drain manifold 110 and a drain pipe 120.

As illustrated in FIGS. 2 and 3, the drain manifold 110 may be connected to at least one discharge line 10 of the substrate treatment apparatus 1000 and define a predetermined accommodation space A1 to temporarily accommodate the treatment liquid 1 discharged from the substrate treatment process in the substrate treatment apparatus 1000.

For example, the drain manifold 110 may be a kind of tub formed in a polygonal container shape or a cylindrical shape closed in all directions in order to define the accommodation space A1.

In this case, the plurality of discharge lines 10 connected to an upper side of the drain manifold 110 may be connected to the recovery lines 610*b*, 620*b*, and 630*b* of the substrate treatment apparatus 1000. The plurality of discharge lines 10 may be independently connected to the recovery lines 610*b*, 620*b*, and 630*b* of the single substrate treatment apparatus 1000 or connected to the recovery lines of the plurality of substrate treatment apparatuses in an integrated manner.

The drain pipe 120 may be connected to a bottom surface of the accommodation space A1 so that the treatment liquid 1 accommodated in the accommodation space A1 of the drain manifold 110 may be discharged to the outside.

In this case, as illustrated in FIG. 2, the drain pipe 120 defines a level difference with the predetermined height H in the accommodation space A1 of the drain manifold 110. The drain pipe 120 may protrude by the predetermined height H from the bottom surface of the accommodation space A1 toward the upper side of the accommodation space A1 in order to define a buffer space B in which the treatment liquid 1, which is discharged from the substrate treatment apparatus 1000 and collected in the accommodation space A1, may be temporarily accommodated, until the treatment liquid 1 reaches a level corresponding to the predetermined height H in the accommodation space A1, and then discharged.

For example, as a coating layer forming process of forming a polymer coating layer c by spraying a dissolving liquid b and a curable polymer a onto the substrate S in the treatment space A2 and a stripping process of spraying a stripping liquid d to strip the polymer coating layer c cured on the substrate S are performed to perform the process of cleaning the substrate S by using the curable polymer a in the substrate treatment apparatus 1000, the treatment liquid 1, which is discharged from the substrate treatment apparatus 1000 and temporarily accommodated in the buffer space B of the drain manifold 110, may be the stripping liquid d containing deionized water (DI water), which is sprayed to strip the polymer coating layer c cured on the substrate S during the stripping process, and contain stripped suspended materials 2 of the polymer coating layer c stripped from the substrate S.

Figure 7:
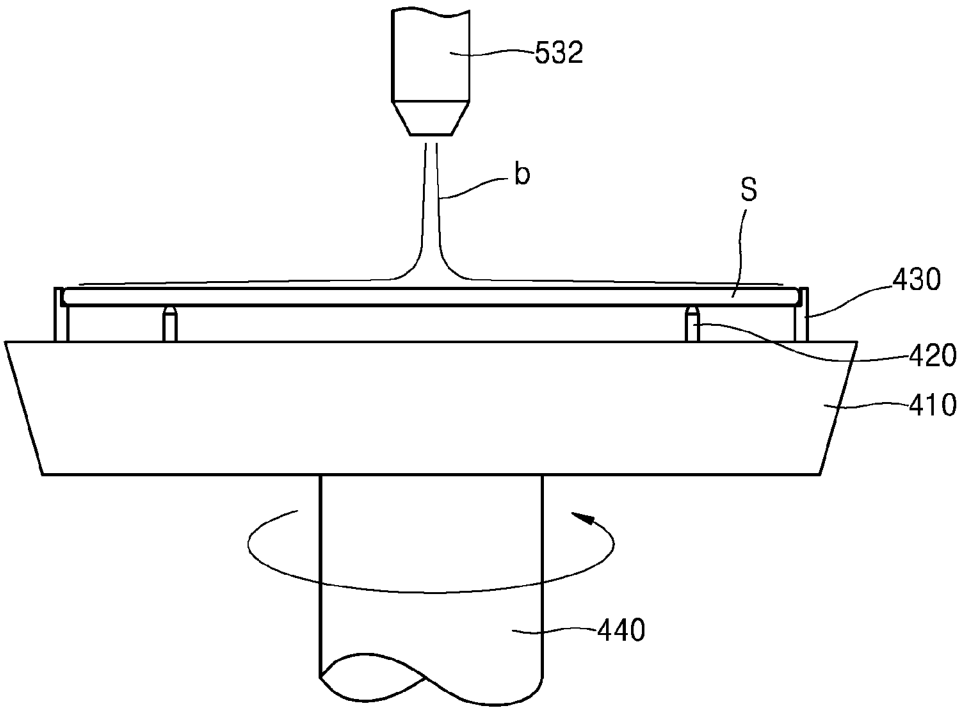
FIGS. 7 to 12 are cross-sectional views illustrating, in a step-by-step manner, processes in which the substrate treatment apparatus in FIG. 1 treats a substrate.
Figure 8:
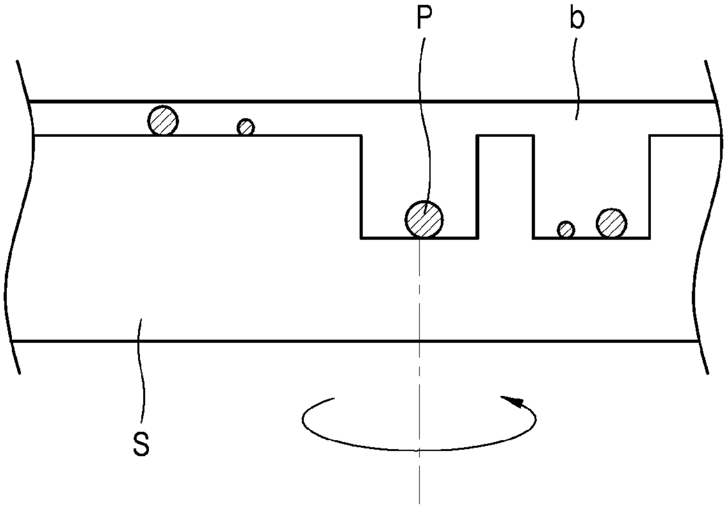
Figure 9:
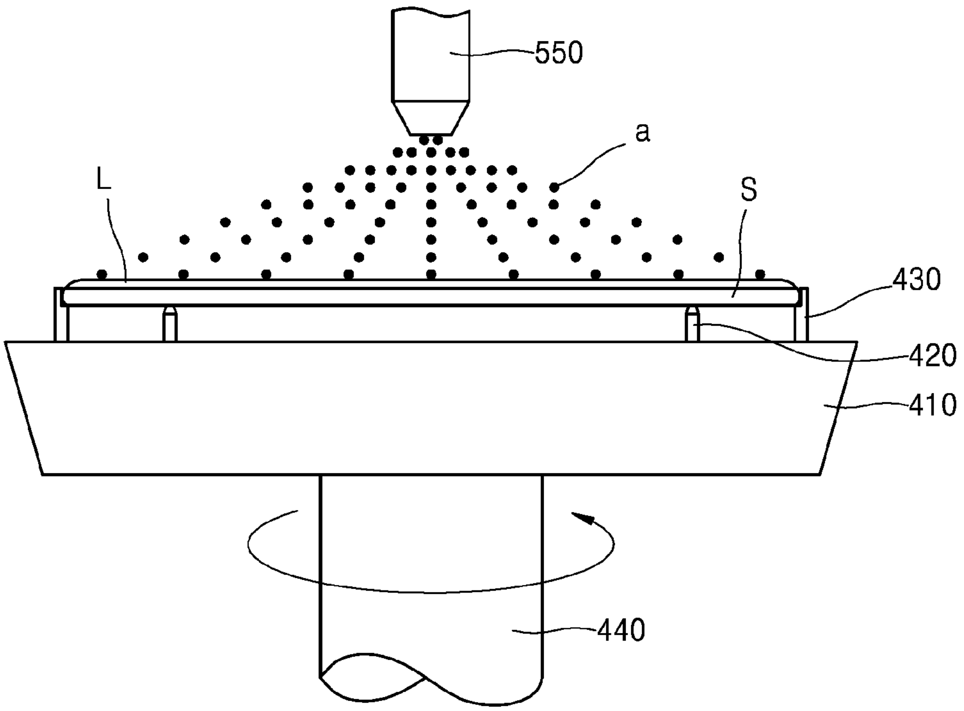
Figure 10:
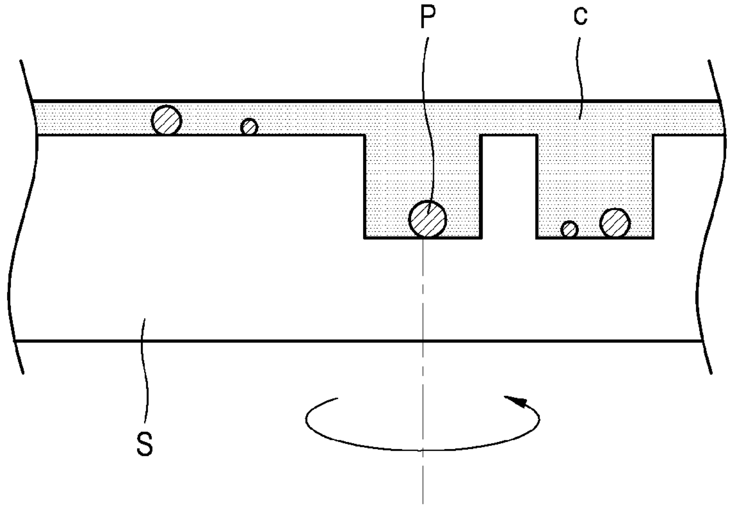

More specifically, as illustrated in FIG. 7, during the coating layer forming process in the substrate treatment apparatus 1000, the dissolving liquid supply nozzle 532 supplies the dissolving liquid b onto the rotating substrate S, such that the dissolving liquid b may form a film on the substrate S, as illustrated in FIG. 8. Next, as illustrated in FIG. 9, the polymer supply nozzle 550 may supply the curable polymer a to the dissolving liquid b that forms the film on the rotating substrate S. When the dissolving liquid b and the curable polymer a are applied onto the substrate S as described above, the curable polymer a may be dissolved in the dissolving liquid b and then cured, such that the polymer coating layer c may be formed, as illustrated in FIG. 10. The polymer coating layer c may adsorb particles P on the substrate S.

Figure 11:
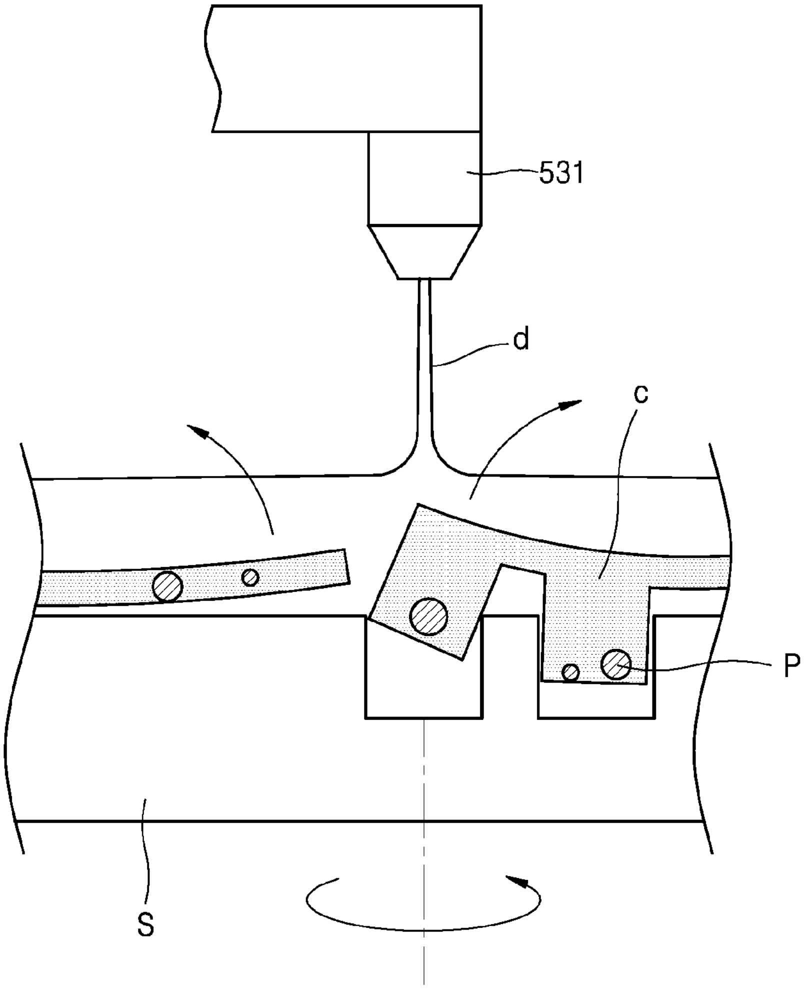

Next, as illustrated in FIG. 11, during the stripping process, the stripping liquid d may be supplied onto the rotating substrate S, such that the polymer coating layer c on the substrate S may be stripped together with the particles P.

Therefore, as illustrated in FIGS. 3 and 4, the treatment liquid 1, which contains the stripped suspended materials 2 of the polymer coating layer c stripped from the substrate S, may be discharged through the discharge line 10 and collected in the buffer space B of the drain manifold 110.

As a removal process of spraying a cleaning liquid 3, which contains isopropyl alcohol (IPA), onto the substrate S in the treatment space A2 is performed in the substrate treatment apparatus 1000 to remove residues e, which remain on the substrate S after the polymer coating layer c is stripped by the stripping process, the treatment liquid 1, which is temporarily accommodated in the buffer space B of the drain manifold 110, may be discharged to the outside through the drain pipe 120 in a state in which the stripped suspended materials 2 are dissolved in the cleaning liquid 3 discharged through the discharge line 10 of the substrate treatment apparatus 1000 during the removal process.

Figure 12:
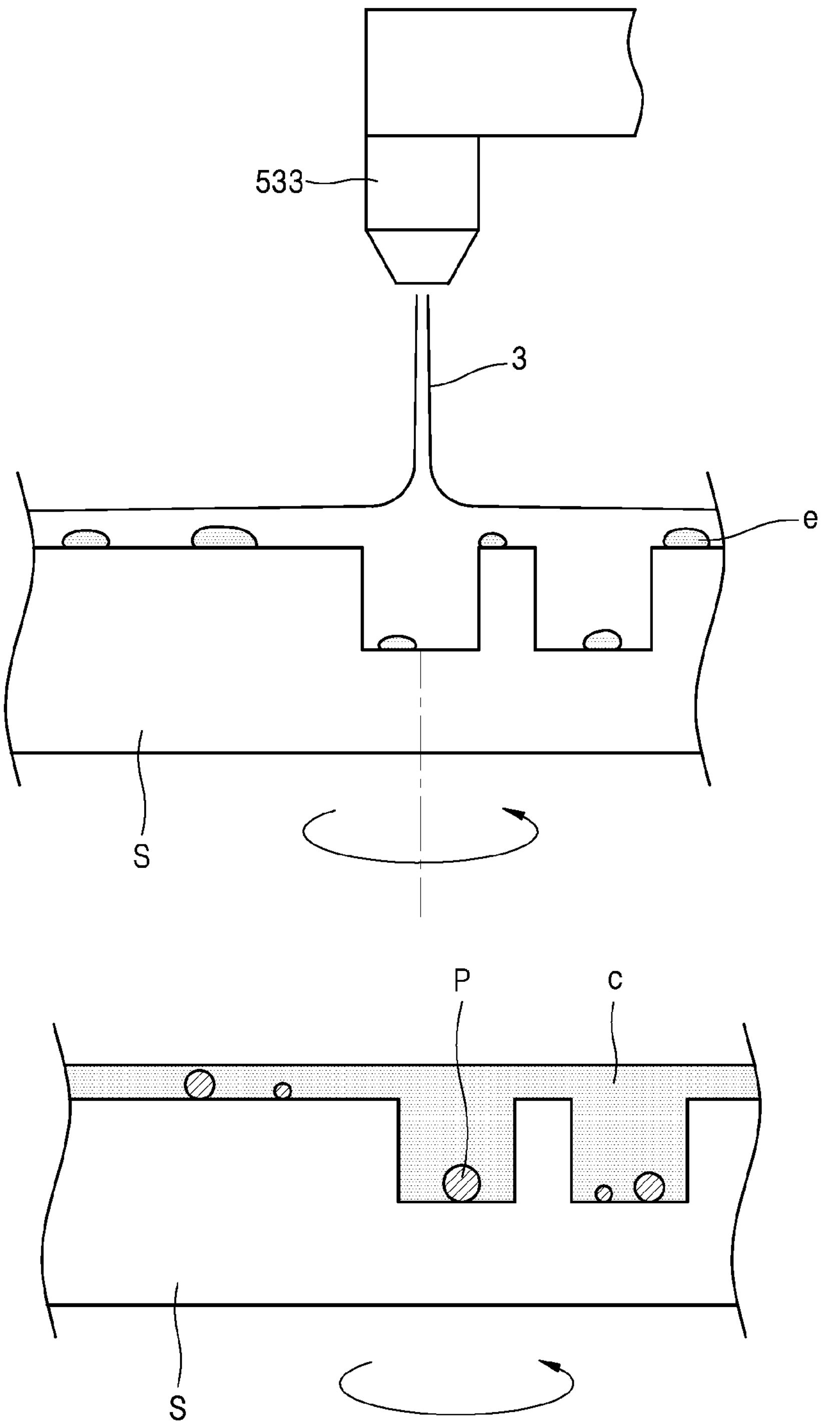

More specifically, as illustrated in FIG. 12, during the removal process performed in the substrate treatment apparatus 1000, the cleaning liquid 3 may be sprayed onto the rotating substrate S, such that the residues e, which remain on the substrate S after the polymer coating layer c is stripped, may be removed from the substrate S.

Therefore, as illustrated in FIG. 5, the cleaning liquid 3, which is discharged through the discharge line 10 of the substrate treatment apparatus 1000 during the removal process, is collected in the buffer space B of the drain manifold 110, such that the stripped suspended materials 2 contained in the treatment liquid 1 temporarily accommodated in the buffer space B may be dissolved in the cleaning liquid 3 containing isopropyl alcohol.

A level of the treatment liquid 1 accommodated in the buffer space B continuously increases during the process in which the stripped suspended materials 2 contained in the treatment liquid 1 temporarily accommodated in the buffer space B are dissolved in the cleaning liquid 3 discharged through the discharge line 10 of the substrate treatment apparatus 1000 during the removal process as described above. The stripped suspended materials 2 in the dissolved state may be discharged to the outside (a waste liquid tank or the like) through the drain pipe 120 when the level of the treatment liquid 1 exceeds the predetermined height H.

In the present embodiment, the example has been described in which the cleaning liquid 3, which is supplied through the discharge line 10, is supplied during the removal process in the substrate treatment apparatus 1000. However, the present invention is not necessarily limited thereto, and a separate cleaning liquid supply line (not illustrated) may be added to the discharge line 10 to often supply the cleaning liquid 3 to the drain manifold 110, as necessary.

For example, as illustrated in FIG. 6, in case that the treatment liquid 1 is evaporated and the stripped suspended materials 2 are accumulated on the bottom surface of the drain manifold 110 as a facility is not used over a long period of time, isopropyl alcohol may be frequently dispensed to prevent the stripped suspended materials 2 from accumulating on the bottom surface of the drain manifold 110 by additionally supplying the cleaning liquid 3.

As described above, the drain manifold 110, which may dissolve and discharge the stripped suspended materials 2 contained in the treatment liquid 1 by using the buffer space B defined by the drain pipe 120 protruding from the bottom surface of the accommodation space A1, may be formed in various shapes in order to improve efficiency in dissolving the stripped suspended materials 2 contained in the treatment liquid 1.

Figure 13:
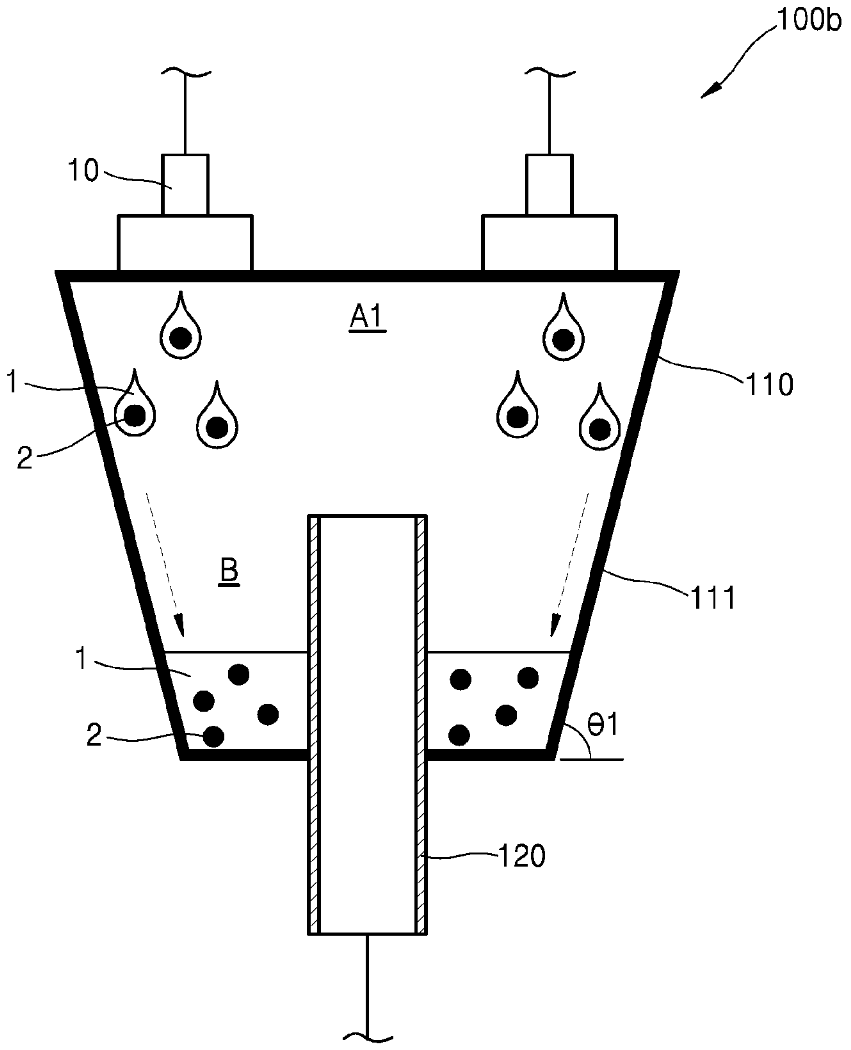
FIGS. 13 to 19 are cross-sectional views schematically illustrating various embodiments of the treatment liquid discharge assembly.

For example, in a treatment liquid discharge assembly 100*b* according to another embodiment of the present invention illustrated in FIG. 13, the drain manifold 110 may include an inclined wall portion 111 formed to be inclined at a predetermined angle θ1 with respect to the bottom surface of the accommodation space A1 and provided on the entire lateral surface of the drain manifold 110 or at least a part of the lower side of the drain manifold 110 so that a width of the drain manifold 110 gradually and linearly decreases toward the bottom surface to which the drain pipe 120 is connected.

For example, the inclined wall portion 111 of the drain manifold 110 may be formed to be inclined from an upper end to a lower end thereof in a direction toward the drain pipe 120 protruding toward the accommodation space A1.

Figure 14:
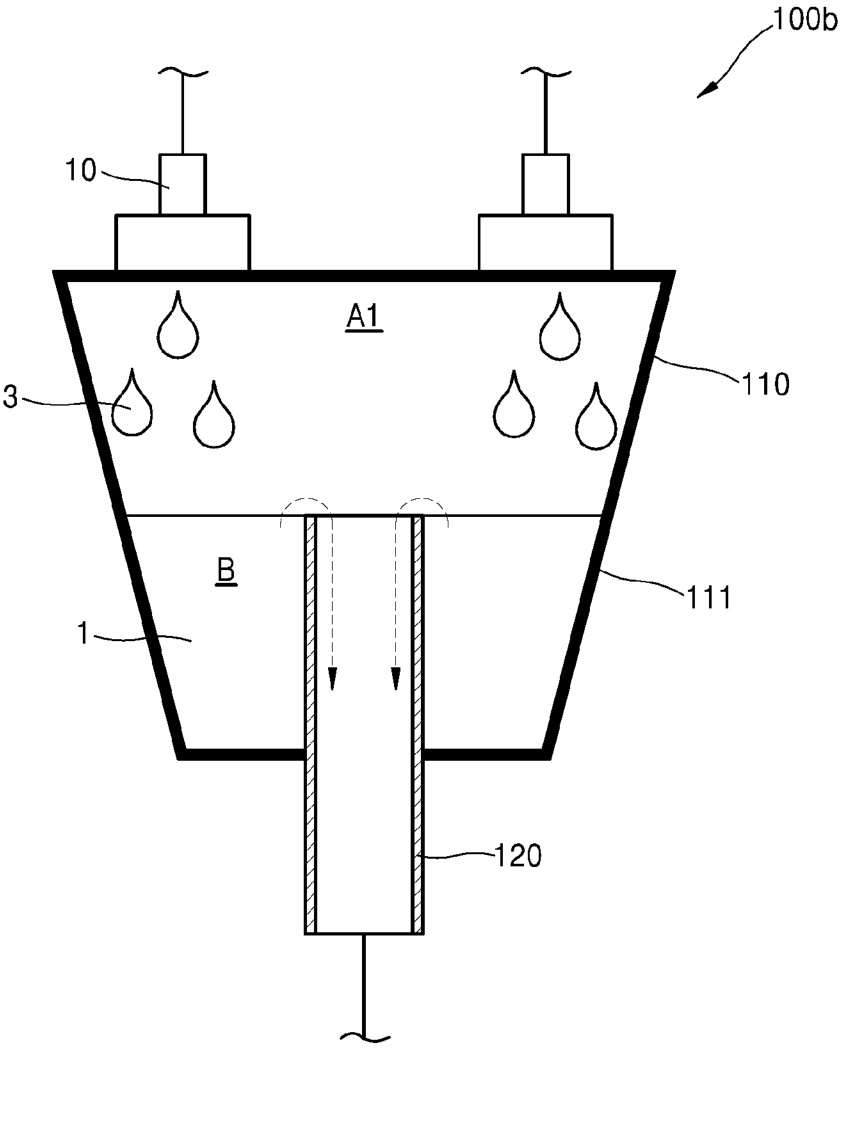

Therefore, the treatment liquid 1 containing the stripped suspended materials 2 is concentrated effectively by being guided along the inclined wall portion 111 to the bottom surface of the accommodation space A1, i.e., the bottom surface of the buffer space B. Therefore, as illustrated in FIG. 14, the stripped suspended materials 2 may be guided to be more effectively dissolved by the cleaning liquid 3 introduced through the discharge line 10 during the process of subsequently treating the substrate S in the substrate treatment apparatus 1000.

Figure 15:
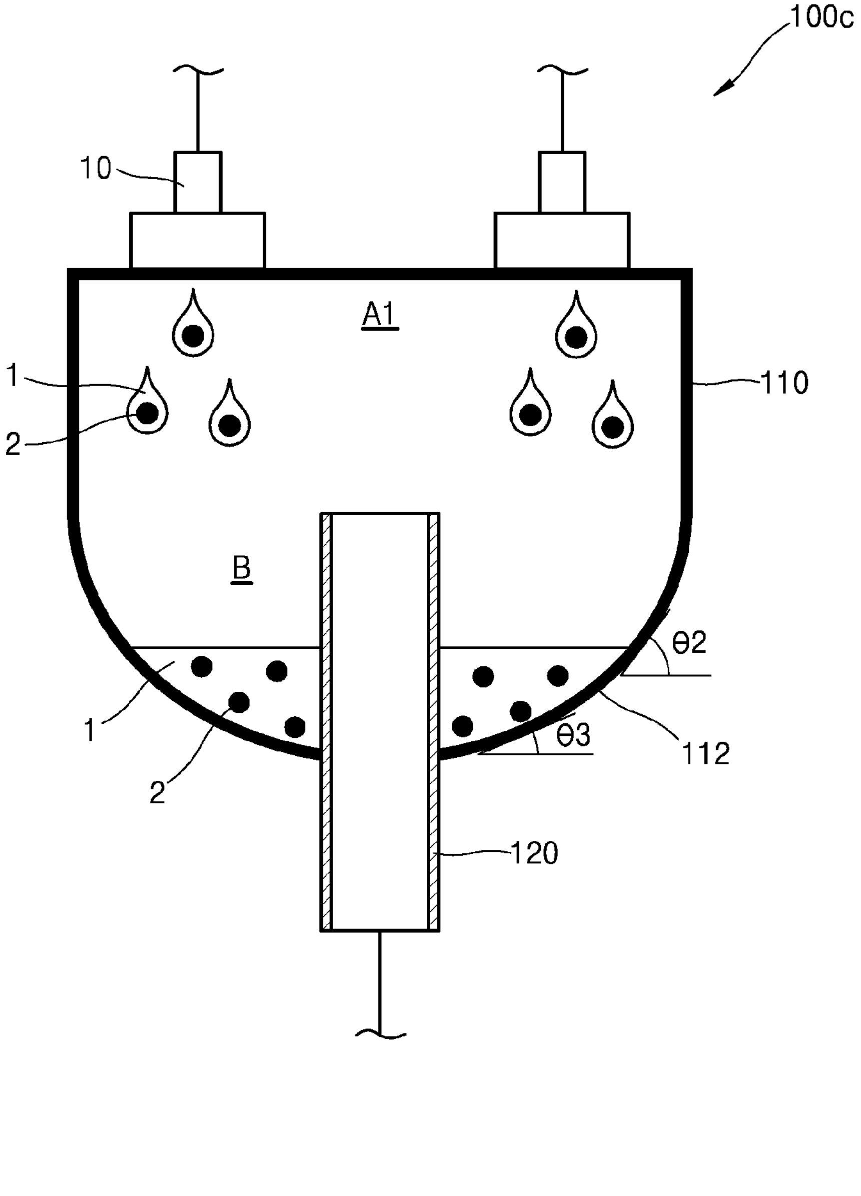

In a treatment liquid discharge assembly 100*c* according to still another embodiment of the present invention illustrated in FIG. 15, the drain manifold 110 may include a curved wall portion 112 formed in a convexly curved shape and provided on the entire lateral surface of the drain manifold 110 or at least a part of the lower side of the drain manifold 110 so that a width of the drain manifold 110 gradually and non-linearly decreases toward the bottom surface to which the drain pipe 120 is connected.

For example, the curved wall portion 112 of the drain manifold 110 may be formed such that an inclination angle of an imaginary tangential line, which is externally in contact with the wall surface, gradually decreases with respect to the bottom surface of the accommodation space A1 from a second angle θ2 to a third angle θ3 from the upper end to the lower end thereof.

Figure 16:
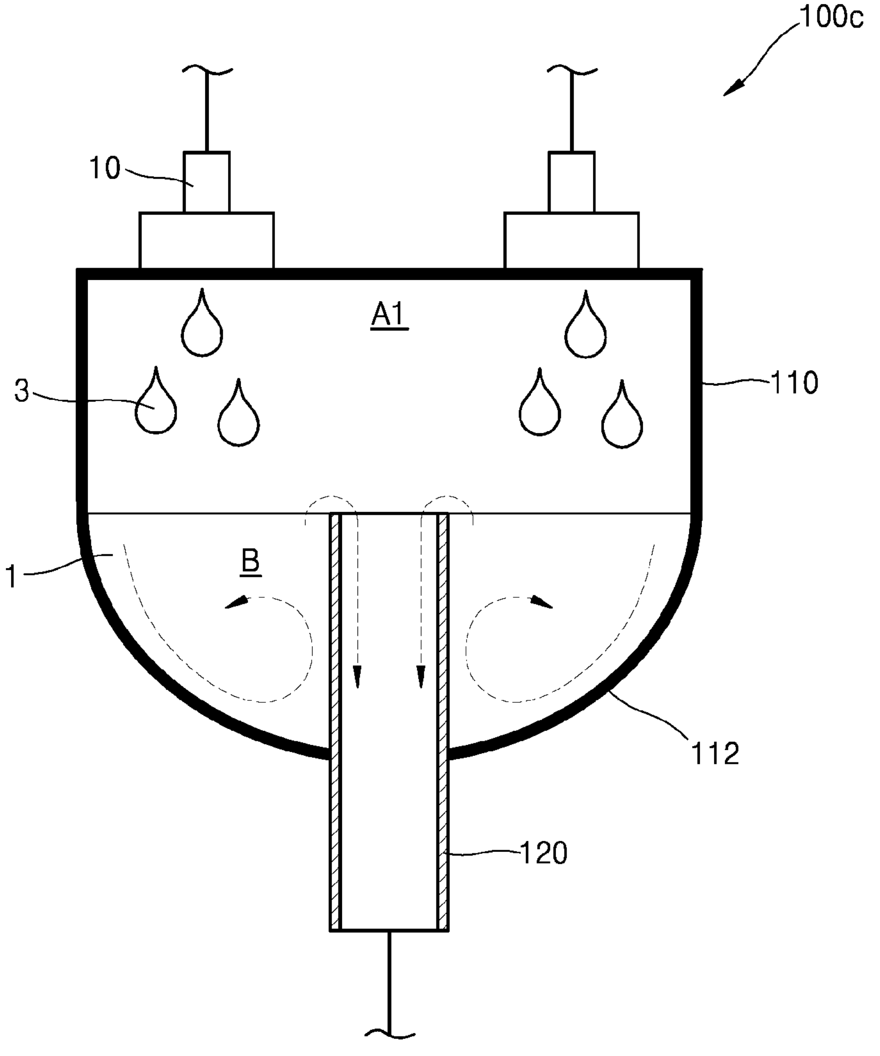

Therefore, the treatment liquid 1 containing the stripped suspended materials 2 is concentrated effectively by being guided along the curved wall portion 112 to the bottom surface of the accommodation space A1, i.e., the bottom surface of the buffer space B. Therefore, as illustrated in FIG. 16, the stripped suspended materials 2 may be guided to be more effectively dissolved by the cleaning liquid 3 introduced through the discharge line 10 during the process of subsequently treating the substrate S in the substrate treatment apparatus 1000. In addition, the efficiency in dissolving the stripped suspended materials 2 may also be improved by vortices that occur when the curved wall portion 112 further accelerates the flow of the cleaning liquid 3 falling from the discharge line 10.

Figure 17:
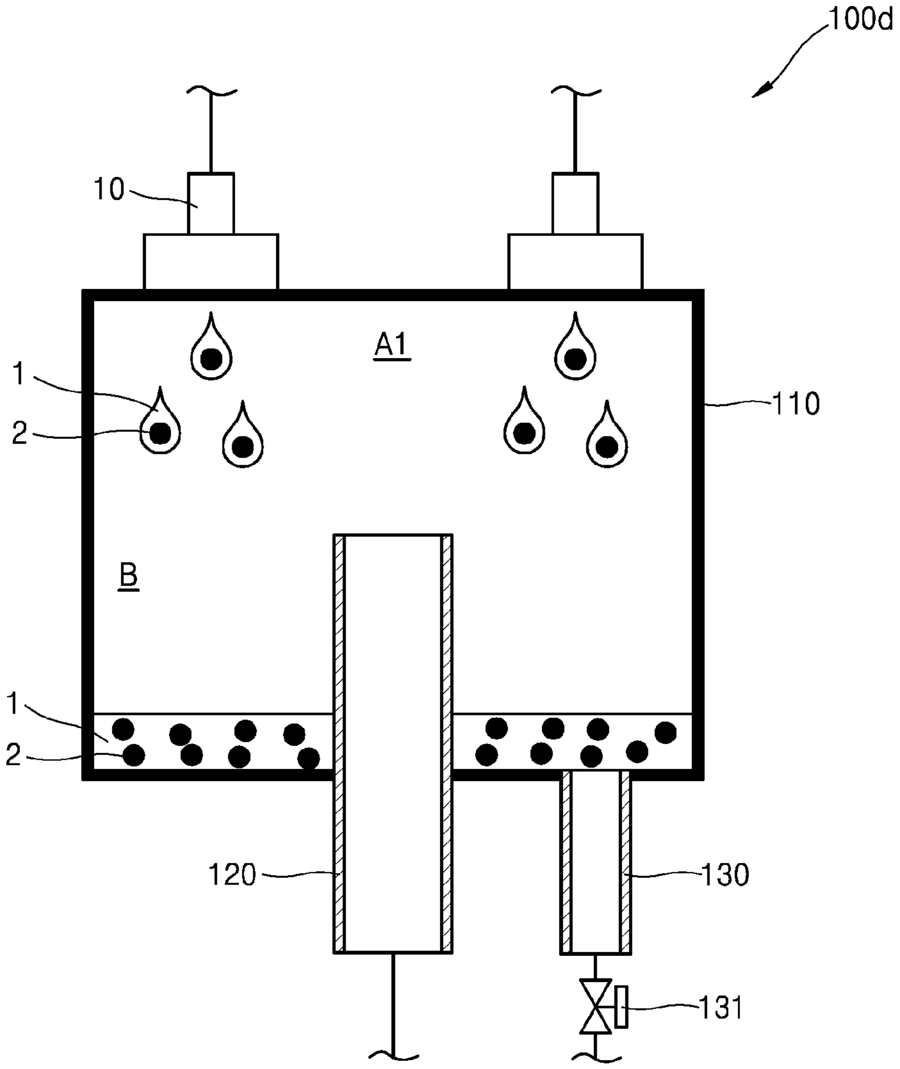

A treatment liquid discharge assembly 100*d* according to yet another embodiment of the present invention illustrated in FIG. 17 may further include an auxiliary drain pipe 130 connected to a portion of the bottom surface the accommodation space A1 corresponding to the buffer space 2 to discharge the treatment liquid 1 containing the stripped suspended materials 2 accommodated in the buffer space B in the accommodation space A1 of the drain manifold 110.

The auxiliary drain pipe 130 may include an on-off valve 131 provided in an inlet part connected to the bottom surface of the accommodation space A1 in order to selectively open or close the auxiliary drain pipe 130.

Therefore, in case that the stripped suspended materials 2 remain even after the stripped suspended materials 2 contained in the treatment liquid 1 are dissolved in the cleaning liquid 3 introduced through the discharge line 10 during the process of subsequently treating the substrate S in the substrate treatment apparatus 1000, an operator may manually open the on-off valve 131 and discharge the stripped suspended materials 2 remaining in the buffer space B independently of the drain pipe 120.

Figure 18:
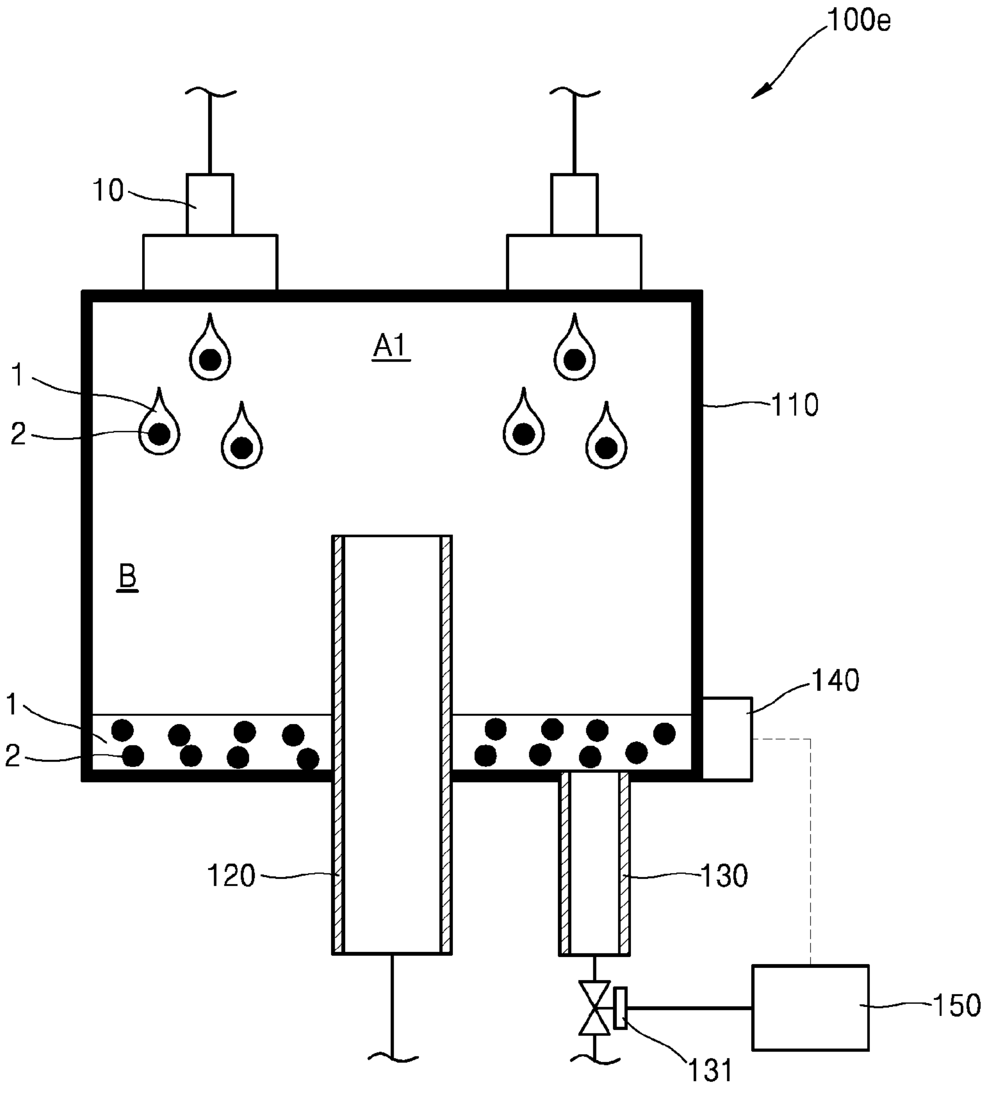

In a treatment liquid discharge assembly 100*e* according to still yet another embodiment of the present invention illustrated in FIG. 18, the drain manifold 110 may include a liquid particle counter 140 installed in the buffer space B and configured to measure a content of the stripped suspended materials 2 contained in the treatment liquid 1 accommodated in the buffer space B, and a discharge control unit 150 configured to apply a control signal to the on-off valve 131 to discharge the treatment liquid 1, which is accommodated in the buffer space B, through the auxiliary drain pipe 130 when the content of the stripped suspended materials 2 measured by the liquid particle counter 140 exceeds a preset reference value.

For example, the liquid particle counter 140 is a sensor capable of sensing the number and sizes of the stripped suspended materials 2 contained in the treatment liquid 1 and may adopt all methods, such as a light scattering measurement method, an electrical resistance measurement method, or a light absorbing measurement method, that may measure the number and sizes of the stripped suspended materials 2 contained in the treatment liquid 1.

Therefore, in case that the stripped suspended materials 2 remain even after the stripped suspended materials 2 contained in the treatment liquid 1 are dissolved in the cleaning liquid 3 introduced through the discharge line 10 during the process of subsequently treating the substrate S in the substrate treatment apparatus 1000, the liquid particle counter 140 may sense the stripped suspended materials 2 contained in the treatment liquid 1 and automatically open the on-off valve 131 by applying the control signal to the on-off valve 131 through the discharge control unit 150, thereby discharging the stripped suspended materials 2, which remain in the buffer space B, independently of the drain pipe 120.

Figure 19:
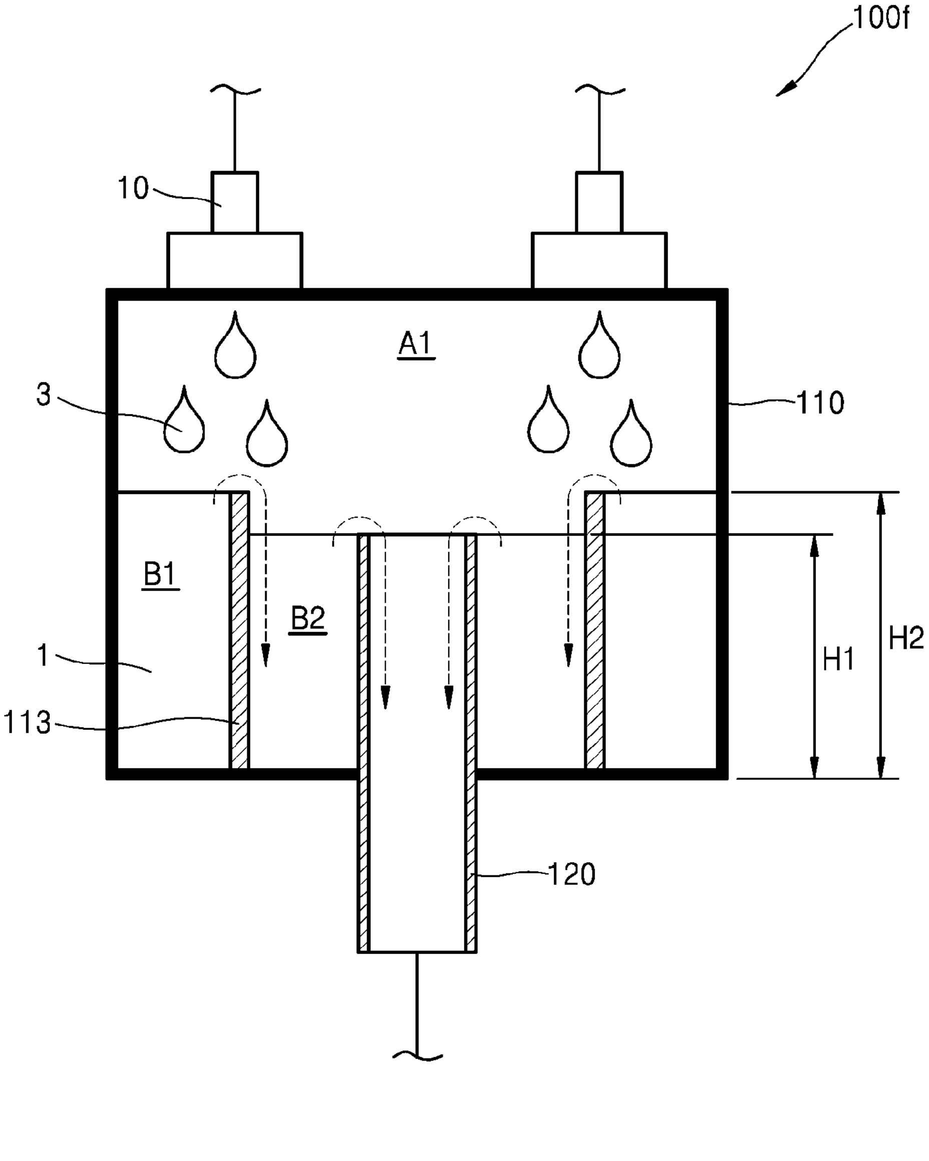

In a treatment liquid discharge assembly 100*f* according to a further embodiment of the present invention illustrated in FIG. 19, the drain manifold 110 may include a buffer wall part 113 formed to surround the drain pipe 120 protruding toward the accommodation space A1 in the buffer space B and configured to divide the buffer space B into a first space B1 and a second space B2.

In this case, the buffer wall part 113 may be formed at a height H2 higher than the predetermined height H1 by which the drain pipe 120 protrudes from the bottom surface of the accommodation space A1.

Therefore, during the process in which the stripped suspended materials 2 contained in the treatment liquid 1 are dissolved in the cleaning liquid 3, the treatment liquid 1 stays first in the first space B1 in the buffer space B, the treatment liquid 1 flows over the buffer wall part 113 and stays in the second space B2 after the level of the treatment liquid 1 reaches a predetermined level (a level corresponding to the height of the buffer wall part 113), and then the treatment liquid 1 is discharged through the drain pipe 120 after the level of the treatment liquid 1 reaches a predetermined level (a level corresponding to the protruding height of the drain pipe 120) again, such that the residence time in the buffer space B increases, which may further improve the efficiency in dissolving the stripped suspended materials 3.

Hereinafter, a treatment liquid discharge method using the treatment liquid discharge assembly 100 according to the several embodiments of the present invention will be described.

Figure 20:
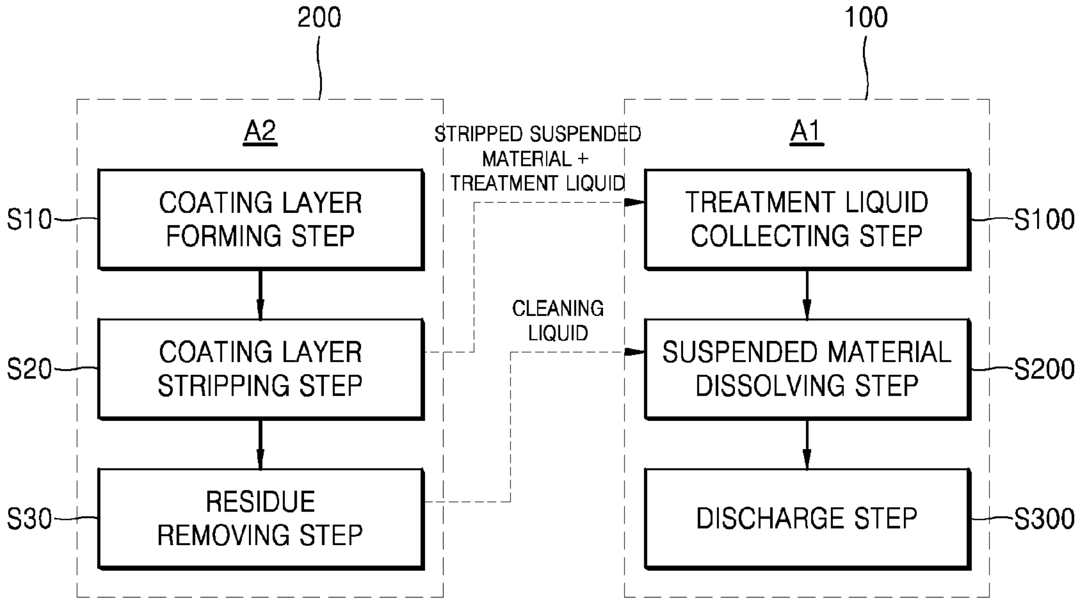
FIG. 20 is a flowchart sequentially illustrating a treatment liquid discharge method according to another embodiment of the present invention.

FIG. 20 is a flowchart sequentially illustrating the treatment liquid discharge method according to another embodiment of the present invention.

As illustrated in FIG. 20, the treatment liquid discharge method may be performed by the treatment liquid discharge assembly 100 and broadly performed in the order of a treatment liquid collecting step S100, a suspended material dissolving step S200, and a dissolved treatment liquid discharge step S300.

For example, in the treatment liquid collecting step S100, the treatment liquid 1 containing the stripped suspended materials 2 of the polymer coating layer c, which is discharged during the process of cleaning the substrate S by using the curable polymer a, may be collected and temporarily accommodated in the accommodation space A1 of the drain manifold 110 connected to the at least one discharge line 10 of the substrate treatment apparatus 1000.

Next, in the suspended material dissolving step S200, during the process of removing the residues e remaining on the substrate S by spraying the cleaning liquid 3 onto the substrate S, the stripped suspended materials 2 contained in the treatment liquid 1 are dissolved in the cleaning liquid 3 discharged from the substrate treatment apparatus 1000 to the accommodation space A1 of the drain manifold 110, and then the treatment liquid 1 having the completely dissolved stripped suspended materials 2 may be discharged to the outside through the drain pipe 120 connected to the bottom surface of the accommodation space A1 in the discharge step S300.

In this case, in the treatment liquid collecting step S100, the temporarily accommodated treatment liquid 1 may be temporarily accommodated in the buffer space B defined in the accommodation space A1 by the drain pipe 120 protruding by the predetermined height H toward the upper side of the accommodation space A1 from the bottom surface of the accommodation space A1.

The cleaning process may be performed in the treatment chamber 200 of the substrate treatment apparatus 1000 during the treatment liquid discharge method, and the cleaning process may include a coating layer forming step S10 of forming the polymer coating layer c on the substrate S by spraying the dissolving liquid b and the curable polymer a in the treatment space A2 of the substrate treatment apparatus 1000, a coating layer stripping step S20 of spraying the stripping liquid d onto the substrate S to strip the polymer coating layer c cured on the substrate S, and a residue removing step S30 of spraying the cleaning liquid 3 onto the substrate S to remove the residues e remaining on the substrate S after the polymer coating layer c is stripped in the coating layer stripping step S20.

Therefore, the treatment liquid 1, which is collected in the treatment liquid collecting step S100, may be the stripping liquid d, which is sprayed to strip the polymer coating layer c cured on the substrate S in the coating layer stripping step S20, and include the stripped suspended materials 2 of the polymer coating layer c stripped from the substrate S. In the suspended material dissolving step S200, the stripped suspended materials 2 contained in the treatment liquid 1 may be dissolved in the cleaning liquid 3 discharged through the discharge line 10 of the substrate treatment apparatus 1000 in the residue removing step S30.

In the dissolved treatment liquid discharge step S300, the treatment liquid 1 temporarily accommodated in the buffer space B may be discharged to the drain pipe 120 during a process in which the level of the treatment liquid 1 accommodated in the buffer space B is increased to be higher than the drain pipe 120, which protrudes by the predetermined height H from the bottom surface of the accommodation space A1, by the cleaning liquid 3 supplied in the suspended material dissolving step S200.

Therefore, according to the treatment liquid discharge assembly 100 and the treatment liquid discharge method according to the several embodiments of the present invention, the drain manifold 110 connected to the discharge line 10 of the substrate treatment apparatus 1000 has the drain pipe 120 connected to the bottom surface of the drain manifold 110 and protruding upward by the predetermined height H from the bottom surface of the drain manifold 110 to temporarily accommodate the treatment liquid 1 discharged from the substrate treatment process, such that the predetermined buffer space B may be defined in the accommodation space A1 of the drain manifold 110.

Therefore, the treatment liquid 1 containing the stripped suspended materials 2 discharged from the substrate treatment process may be temporarily accommodated in the buffer space B of the drain manifold 110, the stripped suspended materials 2 contained in the treatment liquid 1 may be dissolved in the buffer space B by isopropyl alcohol (IPA), which is discharged from the process of subsequently treating the substrate S and introduced into the drain manifold 110, and the treatment liquid 1 may be discharged to the outside through the drain pipe 120.

Accordingly, it is possible to implement the treatment liquid discharge assembly 100 and the treatment liquid discharge method, which are capable of dissolving the stripped suspended materials 2 contained in the treatment liquid 1 discharged from the substrate treatment process in the buffer space B of the drain manifold 110 and then discharging the stripped suspended materials 2 through the drain pipe 120, thereby preventing the drain pipe 120 from being clogged by the adhesion of the stripped suspended materials and preventing the stripped suspended materials 2 from reacting with the other treatment liquids in the waste liquid tank, which causes the production of other by-products.

While the present invention has been described with reference to the embodiment illustrated in the drawings, the embodiment is described just for illustration, and those skilled in the art to which the present invention pertains will understand that various modifications of the embodiment and any other embodiment equivalent thereto are available. Accordingly, the true technical protection scope of the present invention should be determined by the technical spirit of the appended claims.

What is claimed is:

1. A treatment liquid discharge assembly for a substrate treatment apparatus comprising:

a drain manifold connected to at least one discharge line of the substrate treatment apparatus and configured to define an accommodation space to temporarily accommodate a treatment liquid discharged from a substrate treatment process in the substrate treatment apparatus; and a drain pipe connected to a bottom surface of the accommodation space to discharge the treatment liquid, which is accommodated in the accommodation space of the drain manifold, to the outside, wherein the drain pipe includes a bottom end portion extending through a bottom surface of the accommodation space and an upper end portion extending into the accommodation space, the upper end portion being located at a predetermined height above the bottom surface of the accommodation space and below an upper side of the accommodation space to define a buffer space in which the treatment liquid, which is discharged from the substrate treatment apparatus and collected in the accommodation space, is temporarily accommodated, until the treatment liquid reaches a level corresponding to the predetermined height in the accommodation space, and then discharged, wherein the treatment liquid discharge assembly further comprises an auxiliary drain pipe connected to a portion of the bottom surface of the accommodation space corresponding to the buffer space to discharge the treatment liquid containing the stripped suspended materials accommodated in the buffer space in the accommodation space of the drain manifold.

2. The treatment liquid discharge assembly of claim 1, wherein the drain manifold defines the accommodation space, and wherein the drain manifold is configured in at least one of a polygonal container shape or a cylindrical shape.

3. The treatment liquid discharge assembly of claim 1, wherein the drain manifold comprises an inclined wall portion formed to be inclined at a predetermined angle with respect to the bottom surface of the accommodation space and provided on at least a part of a lower side of a lateral surface of the drain manifold so that a width of the drain manifold gradually and linearly decreases toward the bottom surface to which the drain pipe is connected.

4. The treatment liquid discharge assembly of claim 3, wherein the inclined wall portion is formed to be inclined from an upper end to a lower end thereof in a direction toward the upper end portion of the drain pipe extending into the accommodation space.

5. The treatment liquid discharge assembly of claim 2, wherein the drain manifold comprises a curved wall portion formed in a convexly curved shape and provided on at least a part of a lower side of a lateral surface of the drain manifold so that a width of the drain manifold gradually and non-linearly decreases toward the bottom surface to which the drain pipe is connected.

6. The treatment liquid discharge assembly of claim 5, wherein the curved wall portion is formed such that an inclination angle of an imaginary tangential line, which is externally in contact with a wall surface, gradually decreases with respect to the bottom surface of the accommodation space from an upper end to a lower end thereof.

7. The treatment liquid discharge assembly of claim 1, wherein the auxiliary drain pipe comprises an on-off valve provided in an inlet part connected to the bottom surface of the accommodation space to selectively open or close the auxiliary drain pipe.

8. The treatment liquid discharge assembly of claim 1, wherein the drain manifold comprises a liquid particle counter installed in the buffer space and configured to measure a content of the stripped suspended materials contained in the treatment liquid accommodated in the buffer space.

9. The treatment liquid discharge assembly of claim 7, wherein the drain manifold further comprises a discharge control unit configured to apply a control signal to the on-off valve to discharge the treatment liquid, which is accommodated in the buffer space, through the auxiliary drain pipe when the content of the stripped suspended materials measured by the liquid particle counter exceeds a preset reference value.

10. The treatment liquid discharge assembly of claim 1, wherein the drain manifold comprises a buffer wall part formed to surround the upper end portion of the drain pipe extending into the accommodation space in the buffer space and configured to divide the buffer space into a first space and a second space.

11. The treatment liquid discharge assembly of claim 10, wherein the buffer wall part is formed at a height higher than the predetermined height of the upper end portion of the drain pipe above the bottom surface of the accommodation space.

12. A treatment liquid discharge assembly for a substrate treatment apparatus comprising:

a drain manifold connected to at least one discharge line of the substrate treatment apparatus, formed in a polygonal container shape or a cylindrical shape, and configured to define an accommodation space therein to temporarily accommodate a treatment liquid discharged from a substrate treatment process in the substrate treatment apparatus through the at least one discharge line; and a drain pipe connected to a bottom surface of the accommodation space to discharge the treatment liquid, which is accommodated in the accommodation space of the drain manifold, to the outside, wherein the drain pipe includes a bottom end portion extending through a bottom surface of the accommodation space and an upper end portion extending into the accommodation space, the upper end portion being located at a predetermined height above the bottom surface of the accommodation space and below an upper side of the accommodation space to define a buffer space in which the treatment liquid, which is discharged from the substrate treatment apparatus and collected in the accommodation space, is temporarily accommodated, until the treatment liquid reaches a level corresponding to the predetermined height in the accommodation space, and then discharged, wherein the treatment liquid, which is temporarily accommodated in the buffer space of the drain manifold, is discharged to the outside through the drain pipe, wherein the treatment liquid discharge assembly further comprises an auxiliary drain pipe connected to a portion of the bottom surface of the accommodation space corresponding to the buffer space to discharge the treatment liquid containing the stripped suspended materials accommodated in the buffer space in the accommodation space of the drain manifold.

* * * * *